(12) United States Patent
Retali

(10) Patent No.: US 12,537,284 B2
(45) Date of Patent: Jan. 27, 2026

(54) AIRCRAFT LIGHT PROVIDED WITH AN ANTENNA

(71) Applicant: GLOBALSYS, Bonneuil sur Marne (FR)

(72) Inventor: Dominique Retali, Champigny-sur-Marne (FR)

(73) Assignee: GLOBALSYS, Bonneuil sur Marne (FR)

( * ) Notice: Subject to any disclaimer, the term of this patent is extended or adjusted under 35 U.S.C. 154(b) by 102 days.

(21) Appl. No.: 18/150,116

(22) Filed: Jan. 4, 2023

(65) Prior Publication Data

US 2023/0216182 A1   Jul. 6, 2023

(51) Int. Cl.
| | |
|---|---|
| *H01Q 1/28* | (2006.01) |
| *B64D 47/04* | (2006.01) |
| *B64F 1/36* | (2024.01) |
| *F21V 33/00* | (2006.01) |
| *F21W 107/30* | (2018.01) |
| *H01Q 1/22* | (2006.01) |
| *H01Q 9/04* | (2006.01) |

(52) U.S. Cl.
CPC ............. *H01Q 1/22* (2013.01); *B64F 1/36* (2013.01); *H01Q 1/28* (2013.01); *H01Q 9/0407* (2013.01); *B64D 47/04* (2013.01); *F21V 33/00* (2013.01); *F21W 2107/30* (2018.01)

(58) Field of Classification Search
CPC ........ H01Q 1/28; H01Q 9/0407; B64D 47/04; F21V 33/00; F21W 2107/30
See application file for complete search history.

(56) References Cited

U.S. PATENT DOCUMENTS

| | | | | |
|---|---|---|---|---|
| 3,683,379 | A | * | 8/1972 | Saddler ................ B60Q 1/0023 340/904 |
| 4,949,067 | A | * | 8/1990 | Martell ................ G08G 1/0962 340/908 |
| 5,446,470 | A | | 8/1995 | Avignon et al. |
| 2007/0008234 | A1 | * | 1/2007 | Capps .................. H01Q 1/3291 343/721 |
| 2008/0158045 | A1 | | 7/2008 | Teranishi et al. |

FOREIGN PATENT DOCUMENTS

| | | |
|---|---|---|
| DE | 102011089421 A1 | 6/2013 |
| FR | 2874277 A1 | 2/2006 |

* cited by examiner

*Primary Examiner* — Hai V Tran
*Assistant Examiner* — Austin M Back
(74) *Attorney, Agent, or Firm* — Muncy, Geissler, Olds & Lowe, P.C.

(57) ABSTRACT

A light for mounting on an aircraft is fitted with a light source, an antenna for establishing radio communication between the aircraft and a ramp agent, or airport equipment, or an airport vehicle, and connection means for connecting a signal cable for linking the antenna to radio communication means of the aircraft.

11 Claims, 2 Drawing Sheets

AIRCRAFT LIGHT PROVIDED WITH AN ANTENNA

BACKGROUND OF THE INVENTION

There exists a need to establish communication between the pilots of an aircraft and ground crew while the aircraft is arriving at or departing from an air terminal. Such communication serves to coordinate the activities of the pilots and of the ground crew (loading or unloading baggage, moving the aircraft by means of a tractor, . . . ).

Conventionally, a ramp agent seeking to establish communication with the aircraft has a headset and connects an associated cable directly to a connector carried by a box arranged on the aircraft landing gear. To make it easier to establish such communication, proposals have been made to establish radio communication between the ramp agent and the aircraft. For this purpose, proposals have been made to provide the aircraft with a dedicated antenna serving to establish radio communication between the aircraft and the ramp agent. It is then desirable for the aircraft to have an antenna with the capacity to radiate the radio signal appropriately in order to maximize its range. Furthermore, it is desirable for such transmissions to be directed towards the front of the aircraft in order to make it possible to communicate with a ramp agent located in front of the aircraft, in particular during stages when the airplane is arriving at the air terminal. The antenna could advantageously be used for other purposes, such as exchanging data with airport equipment for guiding the aircraft towards its parking place or with a vehicle for towing the aircraft, and more generally with any airport equipment or vehicle.

Nevertheless, installing such an antenna on an aircraft that has already been built is problematic. If it is desired to place the antenna on the fuselage, that involves work to adapt or modify the fuselage, possibly installing structural reinforcement, which is expensive and requires a certification procedure with the certification authorities. It is also possible to envisage installing the antenna on one of the undercarriages of the aircraft. Such an installation requires appropriate supports to be provided, and likewise an application for certification.

OBJECT OF THE INVENTION

The invention seeks to facilitate installing an antenna on an aircraft, in particular for communicating with ground crew, or with airport equipment, or with an airport vehicle.

SUMMARY OF THE INVENTION

In order to achieve this object, there is provided a light for mounting on an aircraft and fitted with a light source. According to the invention, the light includes an antenna for establishing radio communication between the aircraft and a ramp agent, or airport equipment, or an airport vehicle, and connection means for connecting a signal cable to connect the antenna to radio communication means of the aircraft.

The term "light", is used herein to mean any device suitable for emitting light to illuminate the surroundings of the aircraft on the ground and attached to an aircraft, and in particular to an undercarriage or to a wheel well door into which the undercarriage can be retracted. For example, it may be a landing light or a taxiing light. Such lights are generally attached to the landing gear of the aircraft, but they can also be mounted on the doors of landing gear bays, or indeed in the wings.

Incorporating the antenna with the light enables an aircraft to be fitted with an antenna without the need for any structural modification to the fuselage or to the landing gear. It then suffices for the electrical harness that powers the light also to include a signal cable for linking the antenna to the radio communication means of the aircraft.

In a preferred arrangement, the light comprises a cover closed by a protective glass cooperating with the cover to define a cavity containing the light source, the antenna being arranged inside the cover in the same cavity as the light source. Thus, the antenna is naturally protected from impacts and from potentially hostile surroundings (relative wind, bad weather, . . . ).

In a variant of the invention, the light includes modulator/demodulator means connected directly to the antenna. Thus, the radiofrequency (RF) signal is generated very close to the antenna.

DETAILED DESCRIPTION OF THE INVENTION

Figure 1:
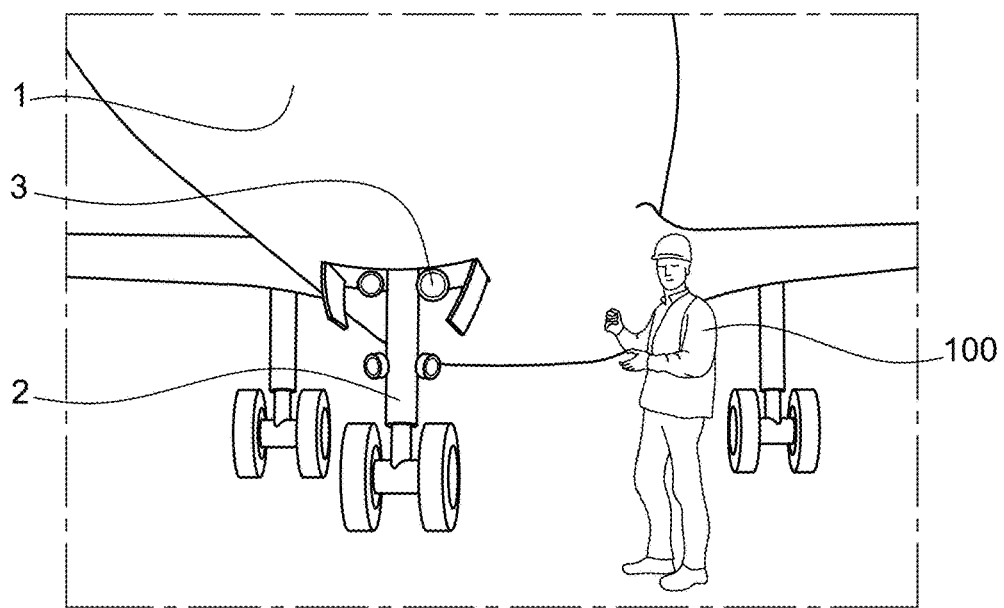
FIG. 1 is a perspective view of an aircraft having an undercarriage carrying a light, with a ramp agent shown in the proximity of the undercarriage.

With reference to FIG. 1, the aircraft 1 that is shown has a nose undercarriage 2 extending under the front of the fuselage. The undercarriage 2 in this example carries a plurality of lights, and in particular a light 3 for projecting light ahead of the aircraft, particularly during stages of landing and takeoff.

Figure 2:
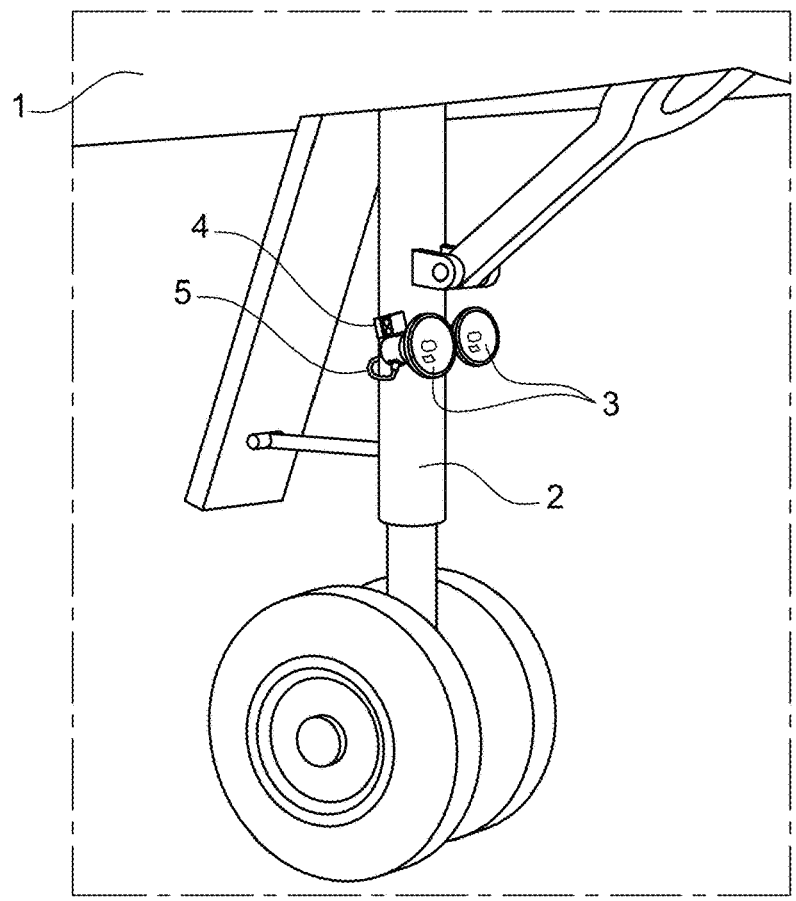
FIG. 2 is a perspective view of an aircraft nose undercarriage carrying a light.

As can be seen in FIG. 2, in this example the light 3 is fastened by means of screws to a support 4 on the undercarriage 2, and a power cable 5 comes down from the fuselage of the aircraft along the undercarriage 2 as far as the light 3.

Figure 3:
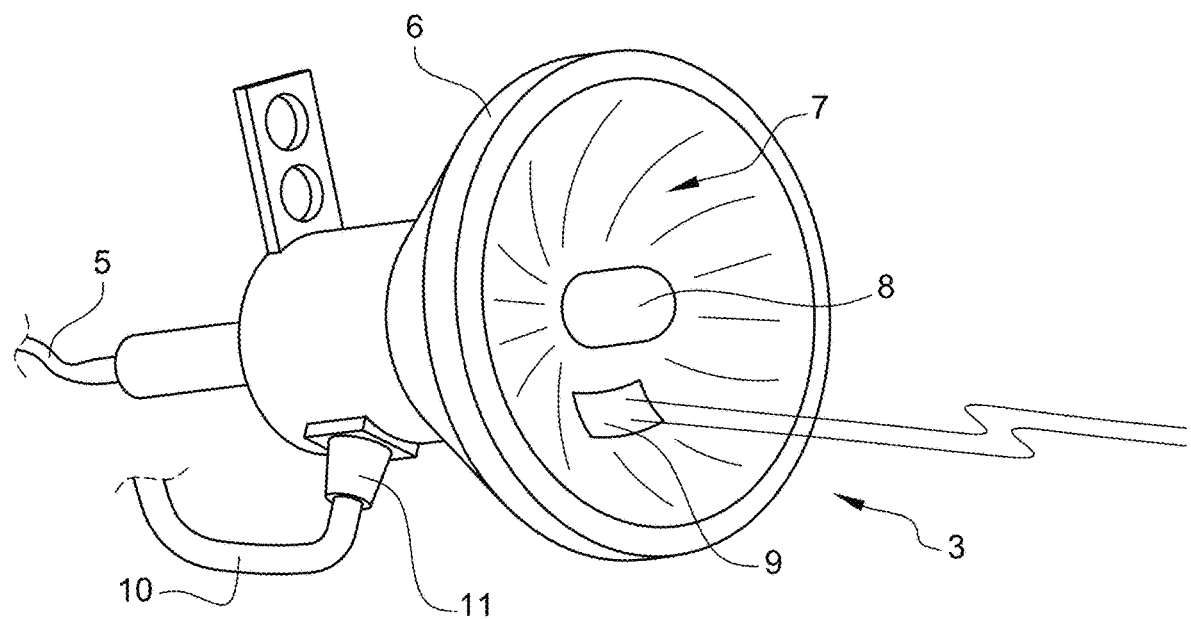
FIG. 3 is a perspective view of a light of the invention.

As can be seen in FIG. 3, the light 3 has a cover 6 that is closed by a protective glass 7 defining a cavity that contains a light source 8, e.g. a lightbulb, that is powered by the power cable 5.

The invention seeks to facilitate communication between the crew of the aircraft 1 and a ramp agent 100 by establishing radio communication.

For this purpose, and in accordance with the invention, an antenna, specifically a flat "patch" type antenna 9, is arranged in the light 3 by being placed inside the cover 6, on its inside face, and thus in the same cavity as the light source 8, and it is arranged to radiate and receive mainly towards the front of the aircraft through the protective glass 7. The antenna 9 is thus protected from the weather and from impacts. The light 3 includes a connector 11 for connecting the antenna 9 to the radio communication means of the aircraft by means of a signal cable 10 that comes down along the undercarriage, in parallel with the power cable 5 for the light source 8.

The antenna 9 serves to establish radio communication with a transceiver carried by the ramp agent 100 (e.g. by being included in a headset), thus enabling the agent to communicate with the crew on board the aircraft. By way of example, the radio communication may take place using freely available frequencies for short-range use of Wi-Fi, DECT, . . . , type, or indeed using any other radio communication protocol. For this purpose, the signal cable 10 conveys an RF signal between the antenna 9 and the radio communication means of the aircraft. The signal cable 10 is preferably shielded in order to avoid any interfering radiation.

Figure 4:
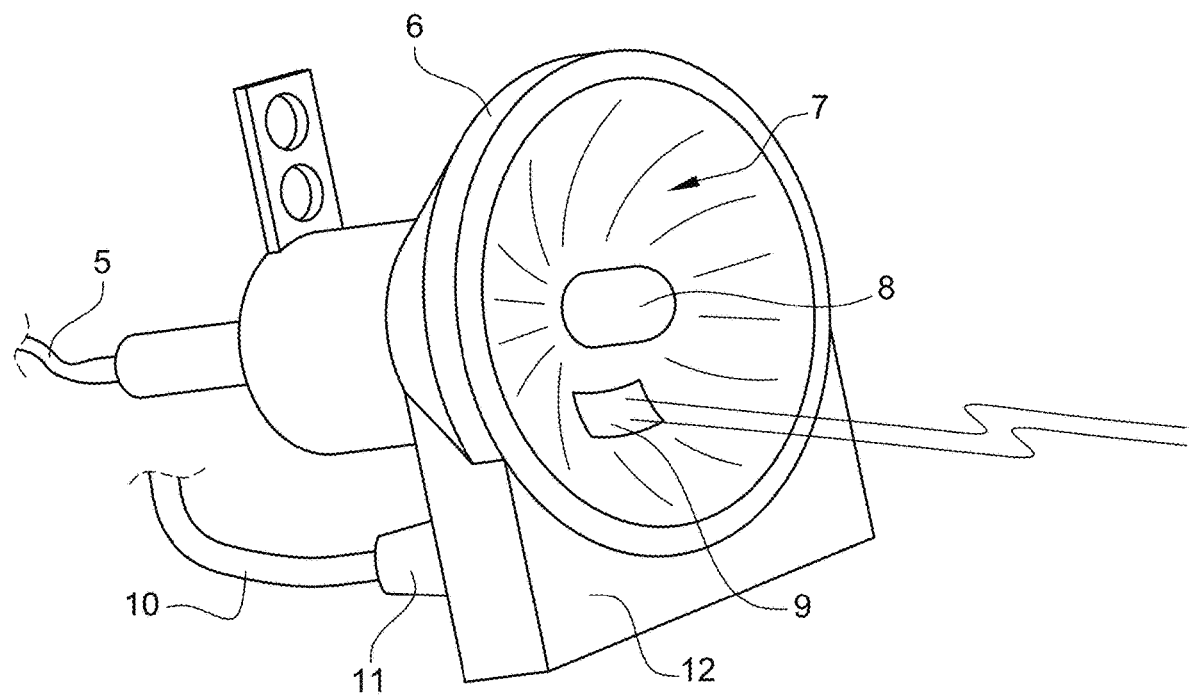
FIG. 4 is a perspective view of a light in a variant of the invention.

In a variant shown in FIG. 4, the light 3 is fitted with a modulator/demodulator unit 12 that is directly connected to the antenna 9, with the signal cable 10 putting said modulator/demodulator unit 12 into communication with the radio communication means of the aircraft. The signal cable 10 then conveys only an audio or data signal without any RF modulation.

The invention is particularly adapted for retrofitting existing aircraft. Specifically, in order to provide radio connections between ground crew and the aircraft, or indeed data communication between the aircraft and airport equipment or an airport vehicle, it suffices to replace an existing light of the aircraft with a light of the invention that is attached to the same support as the existing light, and then to run a signal cable from the radio communication means of the aircraft to the light. This retrofit can be done without any structural modification to the fuselage or to the landing gear and it therefore does not require any structural re-certification. Advantageously, a light of the invention is provided with the same interfaces as existing lights.

The invention is not limited to the above description, but on the contrary covers any variant coming within the ambit defined by the claims. In particular, although above, the light source of the light is a bulb, the light source could be of any other kind, such as for example one or more light-emitting diodes (LEDs).

Although above, the invention is used to provide radio communication between the aircraft and a ramp agent, the invention could be used to provide data communication for airport operations between the aircraft and airport equipment or an airport vehicle.

Although above, the light of the invention is preferably arranged on the nose undercarriage of the aircraft, it could equally well be arranged on a different undercarriage, on the door of a well into which the undercarriage is retracted in flight, or indeed on the structure of the fuselage or of the wings.

Although above, the antenna is of the patch type, which can be incorporated very easily in a light, the antenna could be of any other type.

Although above, the antenna is incorporated in the cavity defined by the cover and the protective glass, the invention applies equally to other types of light without a protective glass and in which the light source is directly exposed to the weather.

Above, in order to facilitate understanding the invention, the signal cable 10 is shown as being physically separate from the power cable 5, with both cables extending along the undercarriage via separate paths; however, the signal cable 10 could naturally be combined with the power cable 5 in a common cable harness going down along the undercarriage, the signal cable 10 and the power cable 5 then possibly sharing a common connector for connection to the light of the invention.

The invention claimed is:

1. A method of providing an aircraft with radio communication means for communicating with ramp agents, or with airport equipment, or with an airport vehicle, the method comprising:
 replacing an existing light of the aircraft by a replacement light including an antenna for establishing radio communication between the aircraft and the ramp agent, or the airport equipment, or the airport vehicle, together with connection means for connecting a signal cable to enable the antenna to be linked to radio communication means of the aircraft; and
 arranging a signal cable between the replacement light and the radio communication means of the aircraft,
 wherein the replacement light comprises:
  a light source;
  a protective glass; and
  a cover closed by the protective glass, the protective glass cooperating with the cover to define a cavity containing the light source,
 wherein the antenna is arranged inside the cover within its inner cavity with the light source, the antenna being attached to an inside surface of the cover, but having no connection or physical link to the protective glass, and
 wherein the antenna is distinct from the light source.

2. The method according to claim 1, wherein the antenna of the replacement light is a flat antenna.

3. The method according to claim 1, wherein the replacement light includes modulator means connected directly to the antenna.

4. An aircraft, comprising:
 radio communication means for communicating between the aircraft and a ramp agent, or airport equipment, or an airport vehicle;
 a light including an antenna for establishing radio communication between the aircraft and the ramp agent, or the airport equipment, or the airport vehicle, together with connection means for connecting a signal cable for linking the antenna to the radio communication means of the aircraft; and
 a signal cable arranged between the light and the radio communication means of the aircraft,
 wherein the antenna is arranged inside the cover within its inner cavity with the light source,
 wherein the antenna is attached to an inside surface of the cover, but has no connection or physical link to the protective glass, and
 wherein the antenna is distinct from the light source.

5. The method according to claim 1, wherein the replacement light includes demodulator means connected directly to the antenna.

6. A method of providing an aircraft with radio communication means for communicating with ramp agents, or with airport equipment, or with an airport vehicle, the method comprising:
 replacing an existing light of the aircraft by a replacement light including an antenna for establishing radio communication between the aircraft and the ramp agent, or the airport equipment, or the airport vehicle, together with connection means for connecting a signal cable to enable the antenna to be linked to radio communication means of the aircraft; and
 arranging a signal cable between the replacement light and the radio communication means of the aircraft,
 wherein the replacement light comprises:
  a light source;
  a protective glass; and
  a cover closed by the protective glass, the protective glass cooperating with the cover to define a cavity containing the light source, and wherein the antenna is arranged inside the cover in a bottom of the cavity with the light source, the antenna being disposed on an inside surface of the cover.

7. An aircraft, comprising:
radio communication means for communicating between the aircraft and a ramp agent, or airport equipment, or an airport vehicle;
a light including an antenna for establishing radio communication between the aircraft and the ramp agent, or the airport equipment, or the airport vehicle, together with connection means for connecting a signal cable for linking the antenna to the radio communication means of the aircraft; and
a signal cable arranged between the light and the radio communication means of the aircraft,
wherein the antenna is arranged inside a cover of the light, defining a cavity, in a bottom of the cavity, the antenna being disposed on an inside surface of the cover.

8. A method of providing an aircraft with radio communication means for communicating with ramp agents, or with airport equipment, or with an airport vehicle, the method comprising:
replacing an existing light of the aircraft by a replacement light including an antenna for establishing radio communication between the aircraft and the ramp agent, or the airport equipment, or the airport vehicle, together with connection means for connecting a signal cable to enable the antenna to be linked to radio communication means of the aircraft; and
arranging a signal cable between the replacement light and the radio communication means of the aircraft,
wherein the replacement light comprises:
a light source;
a protective glass; and
a cover closed by the protective glass, the protective glass cooperating with the cover to define a cavity containing the light source,
wherein the antenna is arranged inside the cover within its inner cavity with the light source, the antenna being attached to an inside surface of the cover, but having no connection or physical link to the protective glass, and
wherein the antenna of the replacement light is a flat antenna.

9. An aircraft, comprising:
radio communication means for communicating between the aircraft and a ramp agent, or airport equipment, or an airport vehicle;
a light including an antenna for establishing radio communication between the aircraft and the ramp agent, or the airport equipment, or the airport vehicle, together with connection means for connecting a signal cable for linking the antenna to the radio communication means of the aircraft; and
a signal cable arranged between the light and the radio communication means of the aircraft,
wherein the antenna is arranged inside the cover within its inner cavity with the light source,
wherein the antenna is attached to an inside surface of the cover, but has no connection or physical link to the protective glass, and
wherein the antenna of the replacement light is a flat antenna.

10. A method of providing an aircraft with radio communication means for communicating with ramp agents, or with airport equipment, or with an airport vehicle, the method comprising:
replacing an existing light of the aircraft by a replacement light including an antenna for establishing radio communication between the aircraft and the ramp agent, or the airport equipment, or the airport vehicle, together with connection means for connecting a signal cable to enable the antenna to be linked to radio communication means of the aircraft; and
arranging a signal cable between the replacement light and the radio communication means of the aircraft,
wherein the replacement light comprises:
a light source;
a protective glass; and
a cover closed by the protective glass, the protective glass cooperating with the cover to define a cavity containing the light source,
wherein the antenna is arranged inside the cover in a bottom the cavity with the light source, the antenna being disposed on an inside surface of the cover, and
wherein the antenna of the replacement light is a flat antenna.

11. An aircraft, comprising:
radio communication means for communicating between the aircraft and a ramp agent, or airport equipment, or an airport vehicle;
a light including an antenna for establishing radio communication between the aircraft and the ramp agent, or the airport equipment, or the airport vehicle, together with connection means for connecting a signal cable for linking the antenna to the radio communication means of the aircraft; and
a signal cable arranged between the light and the radio communication means of the aircraft,
wherein the antenna is arranged inside a cover of the light, defining a cavity, in a bottom of the cavity, the antenna being disposed on an inside surface of the cover, and
wherein the antenna of the replacement light is a flat antenna.

* * * * *